United States Patent [19]

Kubota et al.

[11] Patent Number: 5,394,599
[45] Date of Patent: Mar. 7, 1995

[54] METHOD FOR AUTOMATICALLY EXCHANGING A STAMPER UNIT WITH ANOTHER ONE

[75] Inventors: Suinobu Kubota; Kaoru Yanagisawa; Haruo Okada; Yoshiharu Yanagimachi, all of Sakaki, Japan

[73] Assignee: Nissei Plastic Industrial Co., Ltd., Nagano, Japan

[21] Appl. No.: 32,672

[22] Filed: Mar. 17, 1993

[30] Foreign Application Priority Data

Mar. 18, 1992 [JP] Japan ................... 4-091482

[51] Int. Cl.$^6$ ............................ B29C 45/03
[52] U.S. Cl. ................... 29/430; 29/401.1; 29/426.3; 29/428; 29/464; 264/39; 425/186; 425/190; 425/451; 425/453; 425/454; 425/547
[58] Field of Search .......... 425/183, 186, 190, 192 R, 425/193, 195, 810, 547, 451, 455, 454; 264/39; 29/428, 464, 465, 466, 417, 468, 426.3, 401.1, 430

[56] References Cited

U.S. PATENT DOCUMENTS

| | | | |
|---|---|---|---|
| 4,421,469 | 12/1983 | Egger et al. | 425/186 |
| 4,462,783 | 7/1984 | Hehl | 425/186 |
| 4,472,127 | 9/1984 | Cyriax et al. | 425/186 |
| 4,518,338 | 5/1985 | Hehl | 425/186 |
| 4,529,371 | 7/1985 | Nickley | 425/186 |
| 4,555,228 | 11/1985 | Nishiike et al. | 425/186 |
| 4,789,320 | 12/1988 | Sasamura et al. | 425/810 |
| 5,040,965 | 8/1991 | Baird | 425/186 |
| 5,096,404 | 3/1992 | Janos et al. | 425/190 |

FOREIGN PATENT DOCUMENTS 3711080 10/1988 Germany .
61-154912 7/1986 Japan ................... 425/186
61-195815 8/1986 Japan .
62-286717 12/1987 Japan .

Primary Examiner—Jay H. Woo
Assistant Examiner—Joseph Leyson
Attorney, Agent, or Firm—Ostrelenk, Faber, Gerb & Soffen

[57] ABSTRACT

A method for automatically exchanging a stamper unit with another one for an injection molding machine which is operated for injection-molding a disc or the like. The automatic exchanging apparatus substantially includes a case conveyance section and a stamper unit infeed/outfeed section wherein the case conveyance section includes a slide table adapted to move in the longitudinal direction with the aid of a driving unit mounted on a housing, a pair of inside and outside conveyance platforms each adapted to be raised and lowered and a preheating member arranged sidward of the inside conveyance platform with the vertical attitude, while the stamper unit infeed/outfeed section includes an infeed/outfeed path arranged at the fore end part of a driving unit mounted on a platform at the upper part of a frame upwardly extending from a housing and an infeed/outfeed unit arranged behind a suspension unit for provisionally suspending a unit case, the suspension unit being located at the rear part of the infeed/outfeed path. The automatic exchanging method is practiced by way of steps of alternately raising up and lowering the inside and outside conveyance platforms in the conveyance section, temporarily holding each unit case in the infeed/outfeed section and displacing the infeed/outfeed unit in the forward/rearward direction so as to allow a used stamper unit to be exchanged with a new preheated stamper unit.

5 Claims, 5 Drawing Sheets

1

METHOD FOR AUTOMATICALLY EXCHANGING A STAMPER UNIT WITH ANOTHER ONE

BACKGROUND OF THE INVENTION

1. Field of the Invention

The present invention relates generally to exchanging of a die half mounted on a die mounting board of an injection molding machine. More particularly, the present invention relates to a method of automatically exchanging a stamper unit for injection-molding a compact disc, a video disc or the like with another one. Further, the present invention relates to an automatic exchanging apparatus for practicing a method of the foregoing type.

2. Background Art

Conventionally, a die half for injection-molding a disc or the like is designed in the form of a unit which assures that the present stamper having certain information recorded therein can be exchanged with another stamper having different information recorded therein for performing an injection-molding operation to produce other type of discs or the like. A stamper unit (i.e., a die half having a stamper fitted into a cavity surface thereof) is usually designed with small dimensions and its weight is low enough to allow it to be carried directly by an operator. For this reason, exchanging of a used stamper unit with a new one can be achieved manually while they are placed on a side table located sideward of a die mounting board of an injection molding machine.

In the conventional case as mentioned above, since each stamper unit is handled directly with the operator's hands by carrying it to the side table and then receiving another stamper unit for the purpose of stamper unit exchanging, occasionally a malfunction arises that in a stamper unit is damaged or injured during the foregoing handling, resulting in the stamper unit failing to be practically used for injection-molding operations.

To cope with the foregoing malfunction, a cover or the like is placed on the stamper side of each stamper unit. In practice, however, the cover is often removed from the stamper unit before the present stamper unit is exchanged with a new one. In the circumstances as mentioned above, there is recognized a tendency that the cover is restrictively used at the time of conveyance of each stamper unit.

SUMMARY OF THE INVENTION

The present invention has been made in consideration of the aforementioned background.

An object of the present invention is to provide a method and an apparatus for automatically exchanging a stamper unit with another one wherein damage or injury of a stamper can reliably be prevented by using the stamper while it is received in the corresponding stamper unit.

Another object of the present invention is to provide a method and an apparatus for automatically exchanging a stamper unit with another one wherein infeed and outfeed of each stamper unit can automatically be achieved during the exchanging, A further object of the present invention is to provide a method and an apparatus for automatically exchanging a stamper unit with another one wherein exchanging can be achieved under a clean atmosphere without any necessity for a manual operation, According to one aspect of the present invention, there is provided a method of automatically exchanging a stamper unit with another one wherein a first unit case having a new stamper unit received therein is automatically exchanged with a second unit case having a used stamper unit received therein with the aid of an automatic exchanging apparatus including a conveyance section and an infeed/outfeed section located above the conveyance section so as to conduct infeed of the first unit case and outfeed of the second unit case by alternately raising and lowering a pair of inside and outside conveyance platforms arranged in the conveyance section, each of the first and second unit cases being such that at least the opposite side ends and one side surface thereof are kept opened and a stamper is received in the corresponding stamper unit while it inwardly oriented, wherein the method comprises the steps of placing the first unit case on the inside conveyance platform in the conveyance section with the vertical attitude, drawing the used stamper unit on the die mounting board side of an injection molding machine into the infeed/outfeed section with the vertical attitude, receiving the used stamper unit in the second unit case temporarily suspended in the infeed/outfeed section, raising the outside conveyance platform to receive and place the second unit case on the same, lowering the outside conveyance platform to the conveyance section, displacing the inside and outside conveyance platforms in the forward direction, bringing the first unit case having the new stamper unit received therein in the inside conveyance platform located below the infeed/outfeed section, discharging the second unit case having the used stamper unit received therein on the outside conveyance platform to the outside, raising the inside conveyance platform so as to allow the first unit case to be received in and temporarily suspended by the infeed/outfeed section, lowering the inside conveyance platform to the conveyance section, and drawing the new stamper from the first unit case by the action of a thrusting force imparted from the infeed/outfeed section so as to feed the new stamper unit to the die mounting board side.

In addition, according to another aspect of the present invention, there is provided an apparatus for automatically exchanging a stamper unit with another one, wherein the apparatus substantially comprises a conveyance section arranged on a housing thereof and an infeed/outfeed section located above the conveyance section.

Specifically, the conveyance section comprises a slide table adapted to move in the longitudinal direction with the aid of a driving unit disposed on the housing, a pair of inside and outside conveyance platforms each adapted to be raised up and lowered, and a preheating member arranged sideward of the inside conveyance platform with the vertical attitude.

Each of said inside and outside conveyance platforms includes a roller conveying unit at the upper part thereof, a receiving plate at the fore end thereof, a support plate for supporting each unit case having a stamper unit received therein, and a driving power source disposed therein for driving said roller conveying unit.

On the other hand, the infeed/outfeed section comprises a driving unit disposed on a platform secured to the upper part of a frame vertically extending from the housing with the same attitude as that of each conveyance platform, an infeed/outfeed path for guiding the movement of each stamper unit with the aid of a pair of upper and lower roller conveying units arranged in front of the driving unit, a suspension unit arranged at the rear end of the infeed/outfeed path for temporarily suspending a unit case for each stamper unit, an infeed/outfeed unit for conducting infeed and outfeed for each stamper unit, the infeed/outfeed unit being arranged in operative association with the driving unit at the waiting position located behind the infeed/outfeed path, and a chucking unit arranged at the fore end of the infeed/outfeed unit.

With the apparatus constructed in the above-described manner, a used stamper unit can be exchanged automatically with a new preheated stamper unit by forward and rearward displacement and raising/lowering of the inside and outside conveyance platforms arranged on the conveyance section, temporary suspension of each unit case in the infeed/outfeed section, and forward and rearward displacement of the infeed/outfeed unit.

Since infeed and outfeed of the new stamper unit and the used stamper unit are achieved while they are received in the corresponding unit cases, each exchanging operation can be performed under a clean atmosphere. In addition, since each stamper is protected from damage or injury from the time when the corresponding stamper unit is pushed out from the corresponding unit case till the time when it is delivered to the die mounting board. A malfunction will not arise because a stamper has been damaged or injured during the exchanging because neither stamper has been so damaged.

Additionally, since infeed and outfeed of each unit case to be exchanged are achieved by forward and rearward displacement of the inside and outside conveyance platforms arranged on the housing, infeed and outfeed are automatically, alternatively conducted for a short time without any necessity for a manual operation under a condition that a unit case having a new stamper unit received therein is preliminarily placed on the inside conveyance platform. Consequently, each exchanging operation can be performed with reduced manhours.

Further, since each stamper unit is preheated while it is placed on the inside conveyance platform, a temperature adjusting time required after it is secured to the die mounting board can be shortened remarkably. In addition to an advantageous effect that an exchanging time can be shortened, a time required for restarting an injection-molding operation can be shortened remarkably compared with the conventional automatic exchanging apparatus. Consequently, a loss time which arises when many kinds but a small quantity of products are injection-molded on a mass production line can also be shortened, resulting in a reduced injection-molding cost for each injection-molded product.

BRIEF DESCRIPTION OF THE DRAWINGS

The present invention is illustrated in the following drawings which show an apparatus for automatically exchanging a stamper unit with another one (hereinafter referred to as an automatic stamper unit exchanging apparatus) according to an embodiment of the present invention, in which.

DETAILED DESCRIPTION OF THE PREFERRED EMBODIMENTS

The present invention will now be described in detail hereinafter with reference to the accompanying drawings which illustrate a preferred embodiment thereof.

Figure 1:
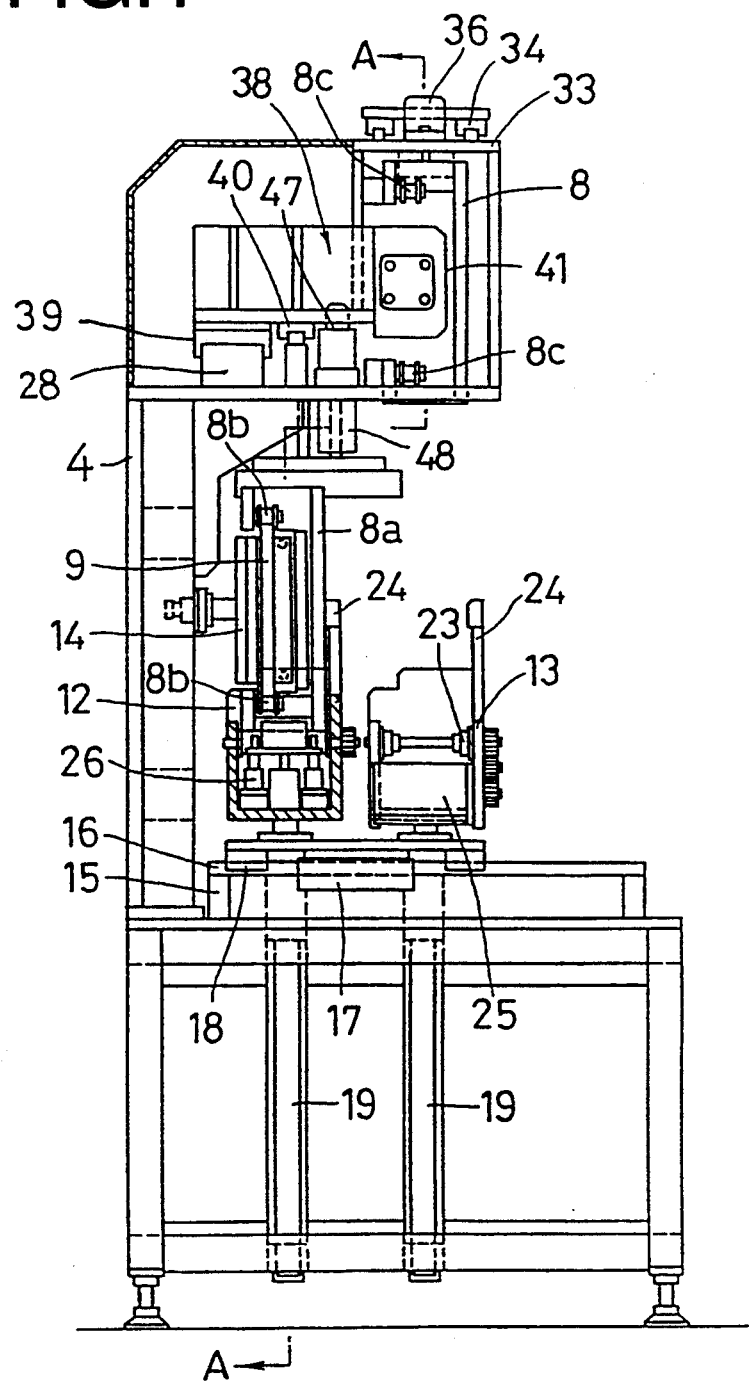
FIG. 1 is a side view of the automatic stamper unit exchanging apparatus.
Figure 2:
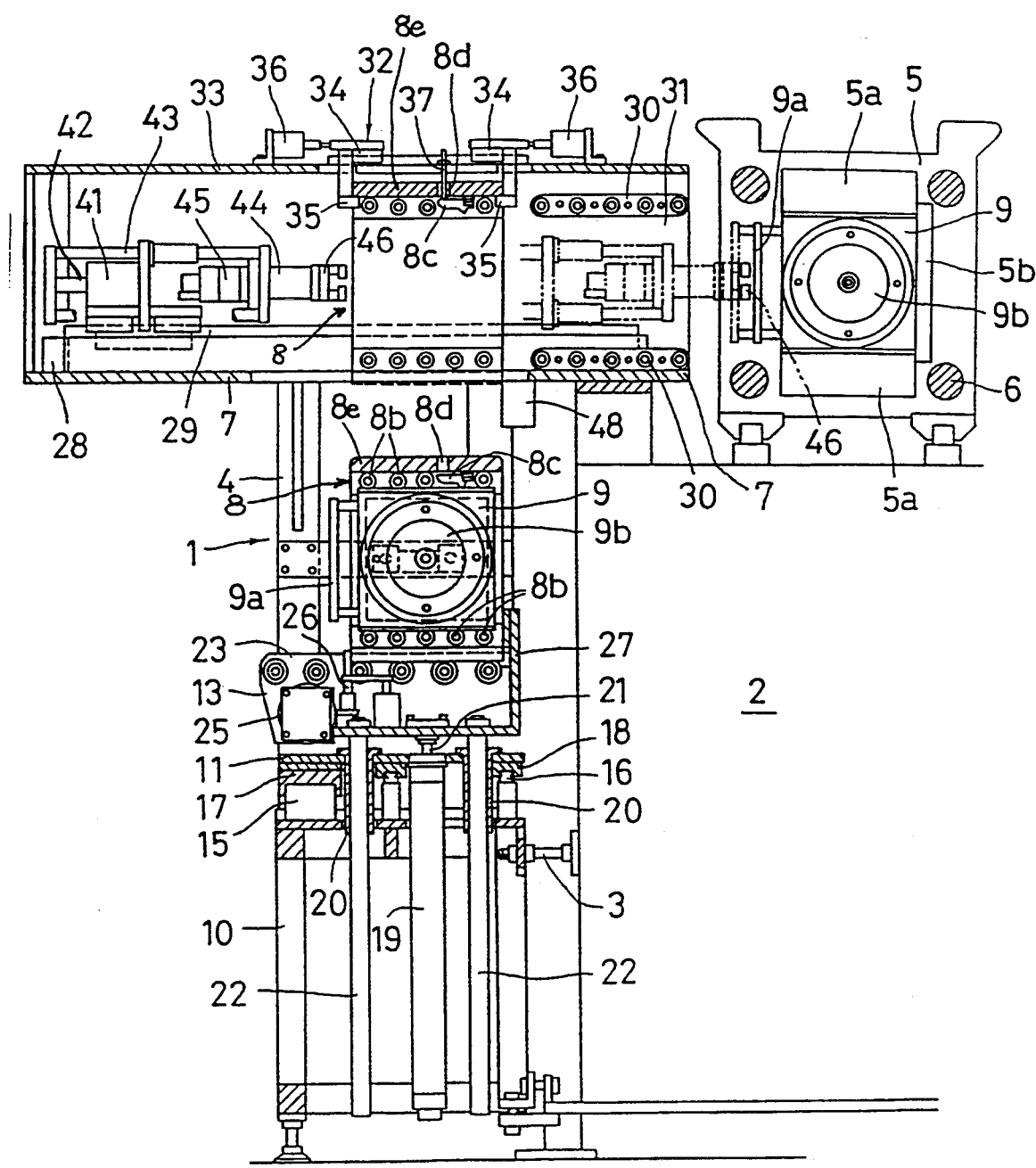
FIG. 2 is a vertical sectional view of the automatic stamper unit exchanging apparatus taken along line A—A in FIG. 1 as well as a die tightening apparatus for an injection molding machine.

In FIG. 1 to FIG. 4, reference numeral 1 designates an apparatus for automatically exchanging a stamper unit with another one (hereinafter referred to as an automatic stamper unit exchanging apparatus) which is constructed according to the embodiment of the present invention. A stamper unit to be exchanged with another one is shown in FIG. 1 and designated by reference numeral 9. The automatic stamper unit exchanging apparatus 1 is fixedly secured to one side of a conventional injection molding machine 2 by tightening a plurality of bolts 3, as shown in FIG. 2. A housing 10 of the automatic stamper unit exchanging apparatus 1 includes a frame 4 which extends in the vertical direction of the housing 10, and lower tie bars 6 for a die mounting board 5 on the stationary side installed on the injection molding machine 2 and a platform 7 located at the substantially same height position as the lower tie bars 6 are horizontally arranged at the upper part of the frame 4.

With the automatic stamper unit exchanging apparatus 1 constructed in the above-described manner, a vertical type unit case 8 having a stamper unit 9 received therein is conveyed on the housing 10, and infeed of the stamper unit 9 to and outfeed of the same from the die mounting board 5 installed on the injection molding machine 2 are performed for the unit case 8 on the platform 7.

The unit case 8 includes a case housing 8a of which at least opposite sides and inside are kept opened. In addition, the unit case 8 includes a plurality of rollers 8b which are arranged along the upper and lower edges of the inside opening thereof. An engagement member 8c for the stamper unit 9 is turnably disposed at the upper part of the unit case 8 to turn in the upward/downward direction, and an insert hole 8d is drilled through a case ceiling plate 8e at the position located in alignment with the rear end of the engagement member 8c.

An injection molding die for molding a disc is composed of a die half (not shown) mounted on the die mounting board 5 on the stationary side and a die half (not shown) mounted on a die mounting board on the movable side. In this embodiment, the stamper unit 9 is employed only for the die half on the stationary side.

Figure 5:
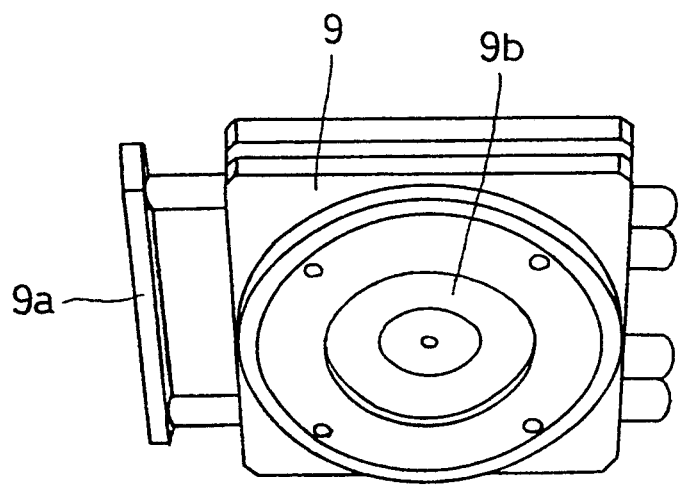
FIG. 5 is a perspective view of a stamper unit.

As shown in FIG. 5, the stamper unit 9 includes a rod-shaped handle 9a, and a stamper 9b is received on the bottom of a circular recess which is coincident with one half of the die cavity. Usually, the stamper 9b is exchanged with another one in a clean room.

The generally flat stamper unit 9 is received at a predetermined position between both the upper and lower rollers 8b of the generally flat unit case 8 by inserting unit 9 in the hollow space defined by them from an opening on the left-hand end side of the unit case 8 with unit 9 being held in a generally vertical plane while the stamper 9b side is inwardly oriented. At this time, the engagement member 8c is engaged with a cutout (not shown) formed on the upper edge of the stamper unit 9 so that the stamper unit 9 is firmly held in the unit case 8 without any possibility that it is disengaged from the unit case 8 in the course of conveyance.

A conveying section of the automatic stamper unit exchanging apparatus 1 includes a slide table 11 adapted to slidably move on the housing 10 in the longitudinal direction defined by rails 16, a pair of inside and outside conveyance platforms 12 and 13 adapted to raised up from and lowered to the slide table 11 and a preheating unit 14 located opposite to the inside conveyance platform 12 with the vertical attitude.

The slide table 11 is slidably arranged on a driving unit comprising a rodless cylinder 15 disposed on the left-hand side of the housing 10 and a pair of rails 16 with the aid of members 17 and 18, and raising/lowering cylinders 19 are arranged at the central part of the slide table 11 with the aid of each of guide sleeves 20 located on the opposite sides of the raising/lowering cylinder 19 while extending in the vertical direction. These components are received in an elongated cavity recessed on the housing 10 so that they move together with the slide table 11 in the longitudinal direction.

It should be noted that the rodless cylinder 15 and a rodless cylinder 28 to be described later are commercially available as a driving unit which includes a magnetic piston adapted to move by the action of air pressure introduced into a cylinder and a magnetic movable member disposed outside of the cylinder to move by the magnetic attractive force given by the magnetic piston.

The inside and outside conveyance platforms 12 and 13 are coincident with each other in structure. That is, platforms 12 and 13 are essentially of the same construction. Rods 21 of the raising/lowering cylinders 19 and guide tubes 22 inserted through the guide sleeves 20 are fixedly secured to the bottom of each of the inside and outside conveyance platforms 12 and 13. A roller conveying unit 23 is arranged at the upper part of each conveyance platform and a support plate 24 is located outside of the roller conveying unit 23 while standing upright from the bottom of each conveyance platform.

A driving motor 25 for driving the roller conveying unit 23 and a stopper unit 26 adapted to move up and down while holding the rear end of the unit case 8 are arranged in each conveyance platform so that the unit case 8 on each conveyance platform is vertically supported with the aid of the stopper unit 26, a receiving plate 27 located at the foremost end of each conveyance platform and the support plate 24.

A stamper unit infeed/outfeed section includes a driving unit comprising a rodless cylinder 28 disposed on one end of the platform 7 while extending horizontally in the longitudinal direction defined by rails 29 with the same orientation as that of each of the inside and outside conveyance platforms 12 and 13. A pair of upper and lower roller conveying units 30 are arranged in front of the driving unit with a predetermined distance kept therebetween while defining an infeed/outfeed path 31 for the stamper unit 9 between the upper and lower roller conveyance units 30.

Figure 4:
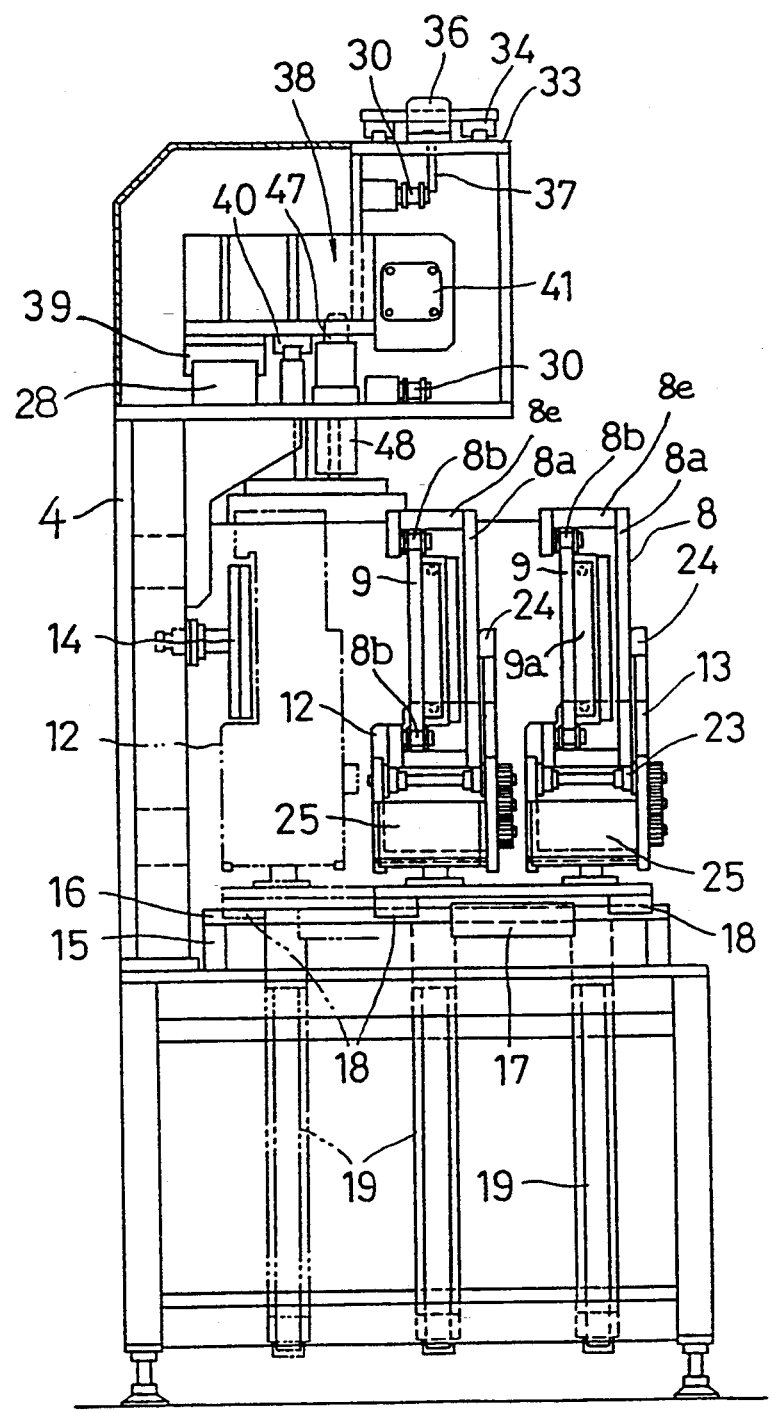
FIG. 4 is a side view of the automatic stamper unit similar to FIG. 1, particularly showing the structure of the automatic stamper unit apparatus at the time of stamper unit exchanging.

In addition, a suspension unit 32 is arranged for the unit case 8 above the rear end of the infeed/outfeed path 31 which is aligned vertically with the outer conveyance platform 13 when the latter is in its rearward position of FIG. 1 and is aligned vertically with inner conveyance platform 12 when the latter is in its forward position of FIG. 4. The suspension unit 32 consists of an opposing pair of sliding members 34 disposed on an upper frame 33 of the platform 7, pawl members 35 extending inward of the sliding member 34 with a distance equal to the width of the unit case 8 kept therebetween, and driving units such as air cylinders or the like for driving the sliding members 34. A rod 37 for releasing the stamper unit 9 from the engaged state caused by the engaging member 8c is inserted through an insert hole 8d which is formed at a part of the upper frame 33 located between both the sliding members 34.

An infeed/outfeed unit 38 is slidably arranged for the stamper unit 9 at the waiting position corresponding to rear end of the infeed/outfeed path 31 in operative association with the foregoing driving unit. The infeed/outfeed unit 38 consists of a thrusting cylinder 41 such as an air cylinder or the like slidably supported on a rodless cylinder 28 and rails 29 with the aid of members 39 and 40, horizontally extending support members 43 connected to a piston rod 42 of the thrusting cylinder 41, and a chucking unit 44 secured to the foremost end of the support members 43.

The chucking unit 44 includes a pair of chucking members 46 which are fixedly mounted on the rotational shaft of a rotating motor 45 so as to seize the stamper unit 9 inserted between both the chucking members 46 via the rod-shaped handle 9a, and the attitude of the chucking member 46 is correctly changed corresponding to the stamper unit 9 by turning them by the motor 45.

In FIG. 1, reference numeral 47 designates a lock pin for the infeed/outfeed unit 38. The lock pin 47 is raised and lowered by actuating an air cylinder 48 attached to the platform 7.

Next, infeed of the stamper unit 9 will be described below with reference to FIG. 2.

Two stamper units 9 as well as two unit cases 8 located at the positions shown in FIG. 2 are coincident with each other in structure but they are twice shown in the drawing in order to facilitate understanding of the structure of the automatic stamper unit exchanging apparatus.

First, the unit case 8 having a new stamper unit 9 received therein is placed on the roller conveying unit 23 of the inside conveyance platform 12 while the opened surface thereof is located on the inside. Subsequently, the unit case 8 is conveyed in the forward direction by rotating rollers of the roller conveying unit 23 as the driving unit 25 is driven.

When the foremost end of the unit case 8 reaches the receiving plate 27, the stopper unit 26 located at the rear end of the unit case 8 is actuated so as to come in engagement with the rear end of the unit case 8, whereby the unit case 8 is supported on the inside conveyance platform 12 while standing upright from the same.

Subsequently, when the rodless cylinder 15 is actuated for displacing the inside and outside conveyance platforms 12 and 13 in the rearward direction, the inside of the stamper unit 9 received in the unit case 8 comes in contact with a preheating member 14 so that the stamper unit 9 is preheated with the preheating member 14. On completion of the preheating, the rodless cylinder 15 is actuated again for displacing the inside conveyance platform 12 along the rails 16 in the forward direction to reach the position occupied by the outside conveyance platform 13. At this time, the outside conveyance platform 13 is displaced outside of the foregoing position.

When the raising/lowering cylinder 19 is actuated to raise the inside conveyance platform 12 after actuation of the rodless cylinder 15 is stopped, the inside conveyance platform 12 is displaced away from the slide table 11 to reach the platform 7 so that the unit case 8 supported on the roller conveying unit 23 is raised to the suspension unit 32. The rod-shaped handle 9a of the stamper unit 9 is inserted between the chucking members 46 located at the waiting positions in the course of the foregoing displacement from below, and thereafter, an unlocking rod 37 is engaged with the engaging member 8c to depress the rear end of the same, whereby the stamper unit is released from the locked state.

When the inside conveyance platform 12 is raised up to the predetermined position, actuation of the raising/lowering cylinder 19 is stopped, and subsequently, the driving units 36 for the suspension unit 32 are driven so as to displace an opposing pair of pawl members 35 in the inward direction. Both the pawl members 35 are brought in engagement with the case ceiling plate 8e from both the open ends of the unit case 8 to firmly hold the unit case 8 at the opposite ends of the latter in the clamped state.

When the rodless cylinder 28 is actuated to displace the infeed/outfeed unit 38 to a predetermined position in the forward direction after the suspension of the unit case 8 is completed, the stamper unit 9 is pushed out from the unit case 8 so that it is inserted into the space defined between a pair of upper and lower clamps 5a on the die mounting board 5 through the infeed/outfeed path 31 with the aid of the upper and lower rollers 30 each serving as guiding means. After movement of the stamper unit 9 is stopped, the infeed/outfeed unit 38 is immovably held by the locking pin 47, and subsequently, the thrusting cylinder 41 is actuated in the forward direction so as to allow the chucking unit 44 to be pushed out together with the arms 43, whereby the stamper unit 9 is provisionally held on the die mounting board 5 while it is thrusted against a receiving plate 5b.

On completion of the provisional holding of the stamper unit 9, the inside conveyance platform 12 is lowered to the slide table 11 and it is then displaced together with the outside conveyance platform 13 on the slide table 11 in the forward direction to return to the original position. At this time, since the unit case 8 is still suspended, it is left at the rear part of the infeed/outfeed path 31. On the other hand, the temperature of the stamper unit 9 which has been provisionally held on the die mounting board 5 side is properly adjusted, and moreover, not only proper die tightening between the die half on the stationary side on the die half on the movable side in the presence of low pressure but also proper die tightening therebetween in the presence of high pressure are confirmed. After completion of the foregoing confirming, the stamper unit 9 is firmly secured to the die mounting board 5.

After all the aforementioned steps are completed, the thrusting cylinder 41 is actuated in the rearward direction so that the chucking unit 44 is restored to the original position together with the arms 43. At the same time, the infeed/outfeed unit 38 is released from the fixed state by retracting the locking pin 47 so that it is displaced in the rearward direction by actuation of the rodless cylinder 28. Thus, the infeed/outfeed unit 38 is held at the waiting position located behind the infeed/outfeed path 31 again.

Figure 3:
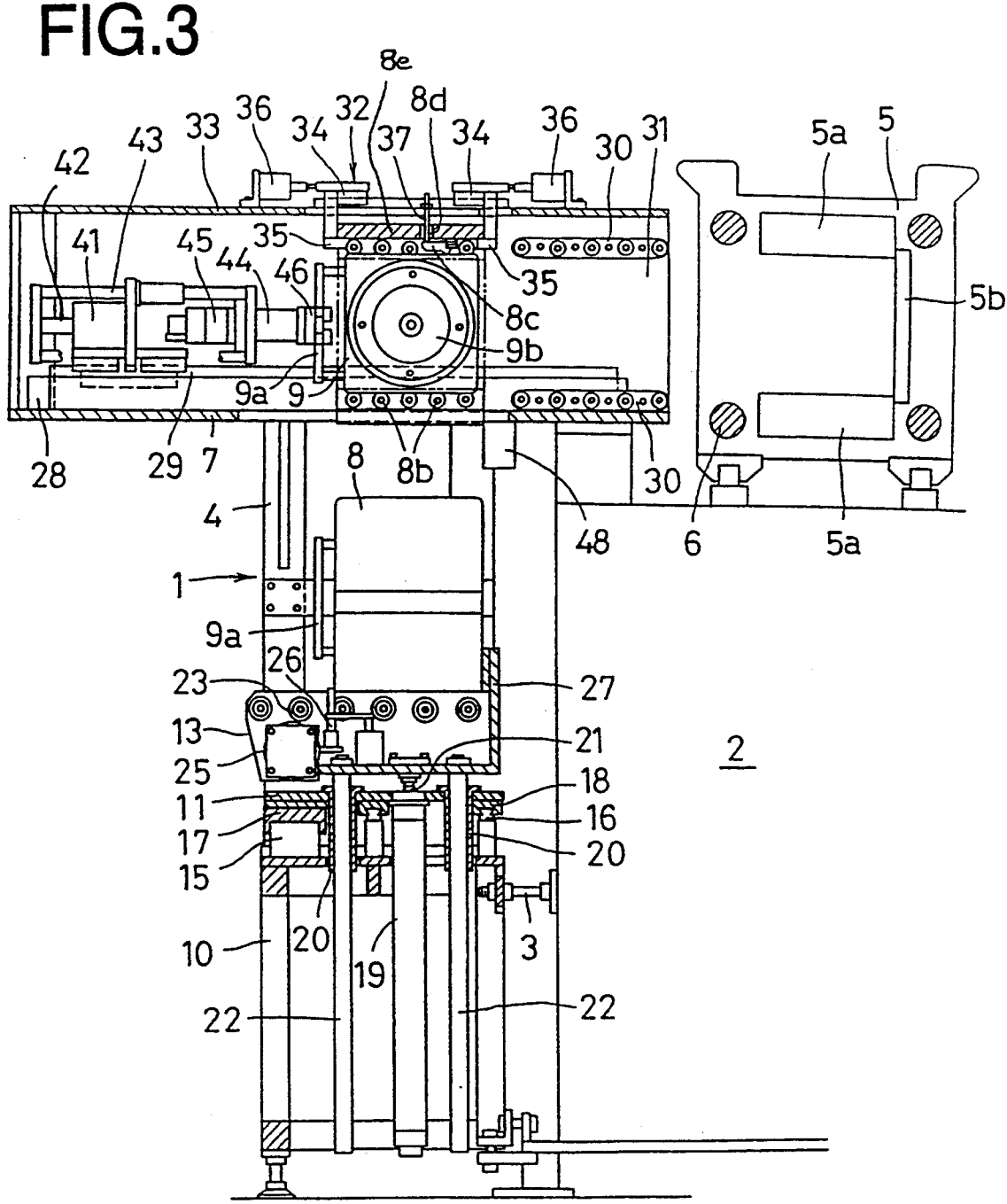
FIG. 3 is a front view of the automatic stamper unit exchanging apparatus similar to FIG. 2, particularly showing the structure of the apparatus at the time of stamper unit exchanging.

Next, outfeed of a used stamper unit will be described below with reference to FIG. 3.

After the stamper unit 9 on the die mounting board 5 is released from the clamped state, the infeed/outfeed unit 38 is displaced in the forward direction so that the chucking members 46 of the chucking unit 44 are engaged with the rod-shaped handle 9a and they are then turned by the motor 45 in order to firmly seize the rod-shaped handle 9a with the chucking members 46.

As the infeed/outfeed unit 38 is displaced in the rearward direction after completion of the chucking, the stamper unit 9 is drawn into the infeed/outfeed path 31 from the die mounting board 5 and it is then displaced further through the infeed/outfeed path 31 with the aid of both the upper and lower roller conveying units 30. At this time, since the unit case 8 is still suspended at the rear end of the infeed/outfeed path 31 coincident with the waiting position for the unit case 8, the stamper unit 9 is received in the unit case 8 when the rearward displacement of the infeed/outfeed unit 38 is stopped at the waiting position of the unit case 8.

Thus, when the outer conveyance unit 13 is raised to the platform 7 by actuating the raising/lowering cylinder 19, the suspended unit case 8 is placed on the roller conveying unit 23. Subsequently, the stopper unit 26 is actuated to support the stopper case 8 with the aid of the receiving plate 27 and the support plate 24.

The chucking members 46 are turned until the present attitude of the chucking members 46 is restored to the original vertical one so as to allow the chucking members 46 to be disengaged from the rod-shaped handle 9a, and thereafter, the unit case 8 is released from the suspended state by disengaging the pawl members 35 from the unit case 8 by actuation of the suspension unit 32.

Subsequently, as the outside conveyance platform 13 is lowered together with the unit case 8, the unlocking rod 37 is drawn from the insert hole 8d, causing the engaging member 8c to be engaged with the stamper unit 9. As a result, there does not arise a malfunction that the stamper unit 9 falls down from the unit case 8 during the lowering.

When the outside conveyance platform 13 is lowered to the slide table 11, the actuation of the raising/lowering cylinder 19 is stopped and the outside conveyance platform 13 is then displaced in the outward direction together with the inside conveyance platform 12 as the slide table 11 is slidably displaced by the rodless cylinder 15. On completion of the outward displacement of the slide table 11, the inside conveyance platform is located at the raising/lowering position on the slide table 11.

After the outward displacement of the slide table 11 is stopped, as the roller conveying unit 23 is driven while the stopper unit 26 is released from the locked state, the unit case 8 is displaced away from the outside conveyance platform 13. Now, the used stamper unit 9 received in the unit case 8 can be exchanged with a new one.

As is apparent from the above description, the automatic exchanging apparatus of the present invention assures that infeed of a unit case having a new stamper unit received therein can be achieved with the inside conveyance platform and outfeed of a unit case having a used stamper unit received therein can be achieved with the outside conveyance platform. In other words, since infeed and outfeed of unit cases can be achieved by alternately displacing a pair of inside and outside conveyance platforms in the forward and rearward direction, the new stamper unit can automatically be exchanged with the used stamper unit at any time as desired under a condition that the unit case having a new stamper unit received therein so as to be exchanged with the used stamper unit is preliminarily placed on the inside conveyance platform.

What is claimed is:

1. A method that utilizes automatic stamper unit exchanging apparatus for replacing a first mold by a second mold, said first and second molds being elements of respective first and second generally flat stamper units, said first stamper unit being in a generally vertical plane and being removably mounted to a die mounting board of an injection molding machine, said method including steps:
    A. loading said second stamper unit into a generally flat second case and then loading said second case on an inside conveyance platform of a conveyance section of said apparatus, with said second case being in a generally vertical plane and said second mold facing rearward away from an outside conveyance platform of said conveyance section, said conveyance platforms being side by side and said inside conveyance platform being rearward of said outside conveyor platform;
    B. utilizing an infeed/outfeed (I/O) section of said apparatus to withdraw said first stamper unit from said molding machine and move said first stamper unit horizontally along a first path to insert said first stamper unit into a generally flat first case which is suspended temporarily at a waiting position aligned vertically with said outside conveyance platform and with said first case being in a generally vertical plane;
    C. utilizing a raising/lowering (R/L) mechanism of said apparatus to raise said outside conveyance platform to said I/O section, loading said first case with said first stamper unit thereon into said outside conveyor platform, and then operating said R/L mechanism to lower said first case below said I/O section;
    D. operating said conveyance section to move said conveyance platforms horizontally forward transverse to said first path until said inside conveyance platform is vertically aligned with said waiting position;
    E. utilizing said R/L mechanism to raise said inside conveyance platform to said I/O section, utilizing said R/L mechanism to lower said inside conveyance platform below said I/O section while suspending said second case temporarily at said waiting position, unloading said second stamper unit from said second case while the latter is suspended temporarily at said waiting position, moving said second stamping unit along said first path to said injection molding machine and mounting said second stamping unit to said die mounting board.

2. A method as set forth in claim 1 also including a step of heating said second mold prior to performing said step D. and while said second case with said second stamper unit therein is on said inner conveyance platform.

3. A method as set forth in claim 1 also including a step of manually removing said first case with said first stamper unit therein from said outside conveyance platform after said step C. has been performed; and
    said step A. being performed manually.

4. A method as set forth in claim 3 also including a step of heating said second mold prior to performing said step D. and while said second case with said second stamper unit therein is on said inner conveyance platform.

5. A method as set forth in claim 1 also including:
    F. removing said first case with said first stamper unit therein from said outside conveyor platform after step C. has been performed; and
    G. after step E, operating said conveyance section to move said conveyance platforms rearward transverse to said first path until said outside conveyance platform is aligned vertically with said waiting position and is ready to rise for receiving said second case after reloading thereof with said second stamping unit.

* * * * *